(12) United States Patent
Brown et al.

(10) Patent No.: US 7,480,414 B2
(45) Date of Patent: Jan. 20, 2009

(54) METHOD AND APPARATUS FOR OBJECT NORMALIZATION USING OBJECT CLASSIFICATION

(75) Inventors: Lisa Marie Brown, Pleasantville, NY (US); Arun Hampapur, Norwalk, CT (US); Ying-Li Tian, Yorktown Heights, NY (US); Chiao-Fe Shu, Yorktown Heights, NY (US); Andrew William Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 10/965,298

(22) Filed: Oct. 14, 2004

(65) Prior Publication Data

US 2006/0083423 A1      Apr. 20, 2006

(51) Int. Cl.
*G06K 9/62* (2006.01)
(52) U.S. Cl. .......................... 382/224; 382/170; 706/20
(58) Field of Classification Search ................ 382/159, 382/165, 103, 173, 190, 224, 170, 181, 180, 382/209, 154, 162, 285, 240; 367/88, 87; 356/418, 416, 419; 707/5, 3; 706/20, 21, 706/52; 716/4, 5; 700/83; 375/240.19; 345/810, 345/840; 348/42, 51
See application file for complete search history.

(56) References Cited

U.S. PATENT DOCUMENTS

| 6,674,877 | B1 * | 1/2004 | Jojic et al. ................. 382/103 |
| 6,829,384 | B2 * | 12/2004 | Schneiderman et al. ..... 382/154 |
| 6,839,081 | B1 * | 1/2005 | Iijima et al. .................. 348/46 |
| 7,050,942 | B2 * | 5/2006 | Hirayama et al. ........... 702/186 |
| 7,324,670 | B2 * | 1/2008 | Kozakaya et al. ........... 382/118 |
| 2004/0190775 | A1 * | 9/2004 | Miller ........................ 382/190 |

* cited by examiner

*Primary Examiner*—Sheela C Chawan
(74) *Attorney, Agent, or Firm*—Ryan, Mason & Lewis, LLP

(57) ABSTRACT

Methods and apparatus are provided for normalizing objects across a plurality of image viewpoints. A set of classification results are obtained for a given object class across a sequence of images for each of a plurality of viewpoints. The classification results are each comprised of a position of one of the objects in the image, and at least one projected property of the object at that position. Normalization parameters are then determined for each of the viewpoints by fitting a high order model to the classification results to model a change in the projected property. The high order model may implement a least squares fit of a second order polynomial to the classification results. The normalization parameters may be used to compute normalized features and normalized training data for object classification.

20 Claims, 3 Drawing Sheets

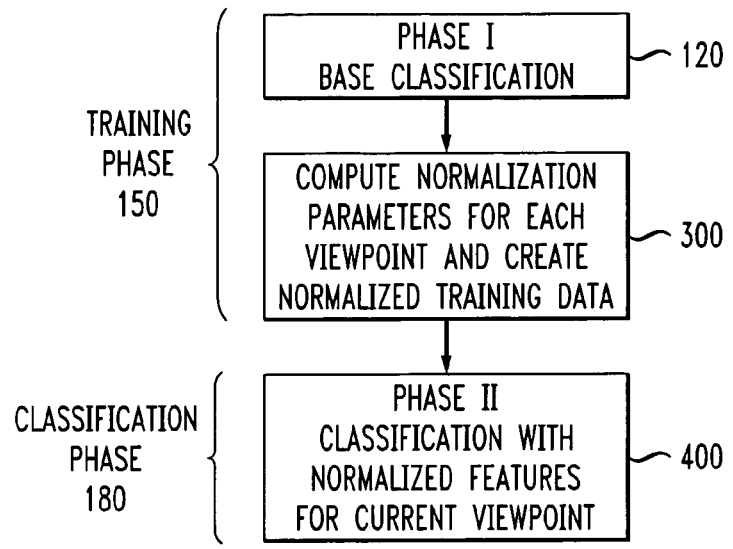
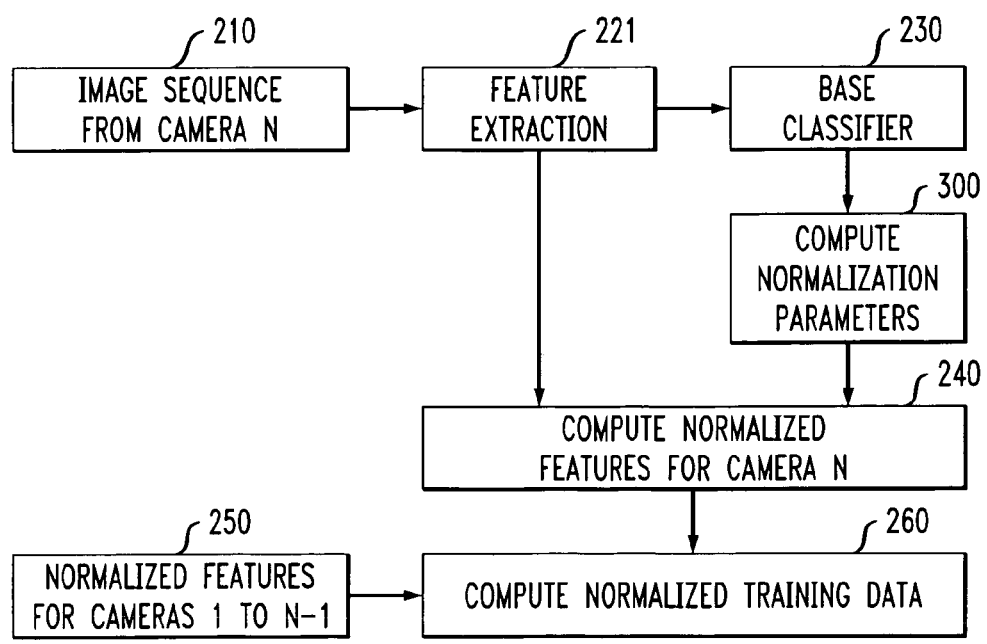

METHOD AND APPARATUS FOR OBJECT NORMALIZATION USING OBJECT CLASSIFICATION

FIELD OF THE INVENTION

The present invention relates to the detection of objects in video sequences using computer vision techniques and, more particularly, to methods and apparatus for the normalization of objects in images.

BACKGROUND OF THE INVENTION

Computer vision techniques are increasingly used to detect or classify objects in images. For example, in many surveillance applications, computer vision techniques are employed to identify certain objects, such as people and vehicles. In addition, many surveillance applications require that an identified object be tracked across an image sequence. While current computer vision techniques can effectively track one or more objects across a sequence of images from the same camera, existing technologies have been unable to reliably track an object of interest across image sequences from different cameras and viewpoints.

The recognition and measurement of properties of objects seen in images from different cameras and viewpoints is a challenging problem. Generally, different viewpoints can cause an object to appear to have different properties, such as size and speed, depending on their position in the image and the viewpoint characteristics. Existing solutions rely on known geometry and manual calibration procedures. A need exists for an automated procedure for normalizing image object data for measuring properties and performing classification.

SUMMARY OF THE INVENTION

Generally, methods and apparatus are provided for normalizing objects across a plurality of image viewpoints. A set of classification results are obtained, for example, from a base classifier or a manual input, for a given object class across a sequence of images (such as object tracks) for each of a plurality of viewpoints. The classification results are each comprised of a position of one of the objects in the image, and at least one projected property of the object at that position. Normalization parameters are then determined for each of the viewpoints by fitting a high order model to the classification results to model a change in the projected property. The projected property may be, for example, a linear size, such as a height, or an orientation of the object.

The high order model may implement, for example, a least squares fit of a second order polynomial to the classification results. In one implementation, the normalization parameters are determined by using image position and object property values to fit a function that relates image position for a given viewpoint to at least one projected property. The normalization parameters may be used, for example, to compute normalized features and normalized training data for object classification.

A more complete understanding of the present invention, as well as further features and advantages of the present invention, will be obtained by reference to the following detailed description and drawings.

BRIEF DESCRIPTION OF THE DRAWINGS

FIG. 1 illustrates an exemplary view independent object normalization and classification system incorporating features of the present invention;

FIG. 2 illustrates the training phase of the object normalization and classification system of FIG. 1 in further detail;

DETAILED DESCRIPTION OF PREFERRED EMBODIMENTS

Figure 3:
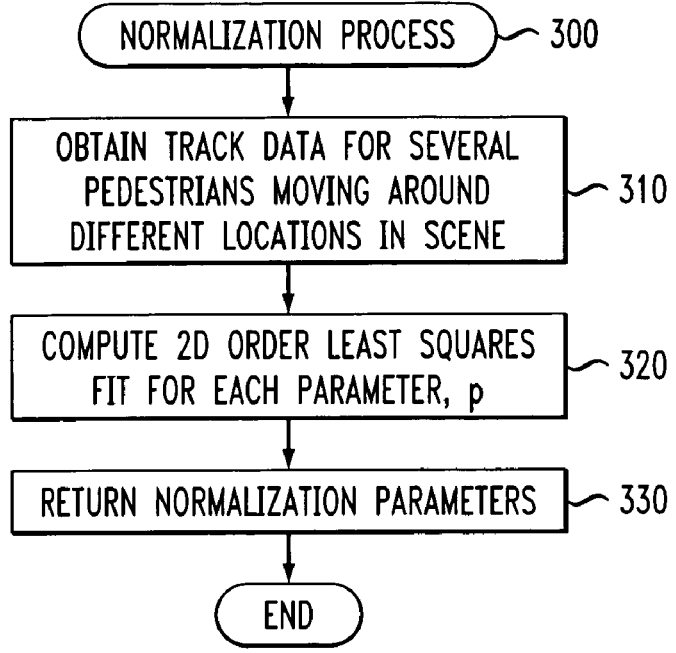
FIG. 3 is a flow chart describing an exemplary implementation of the normalization process of FIG. 2 in further detail.

The present invention provides methods and apparatus for view independent object normalization. Methods and apparatus are disclosed that provide an automated procedure for normalizing image object data for measuring properties and performing classification. The disclosed view independent object normalization techniques may be applied in a number of applications, as would be apparent to a person of ordinary skill in the art. In one illustrative embodiment, the view independent object normalization techniques of the present invention are applied in an exemplary object classification system.

FIG. 1 is a schematic block diagram of an exemplary view independent object normalization and classification system 100 incorporating features of the present invention. In one exemplary implementation of the invention, the view independent object normalization techniques are applied in an object classification system for digital video surveillance that can be used for an arbitrary camera viewpoint.

As shown in FIG. 1, the object normalization and classification system 100 employs a two phase approach to classify moving objects independent of camera viewpoint. During a training phase 150, discussed further below in conjunction with FIG. 2, recognition is initially performed using a base classifier 120 that employs feature-based classification to classify objects, for example, as human or vehicles. The base classifier 120 returns a confidence measure that provides an indication of the likelihood that a classification is correct. The results of the base classification 120 is thereafter used by a normalization process 300, discussed further below in conjunction with FIG. 3, to compute an estimate of the normalization parameters and a normalized training data set. Generally, the normalization process 300 uses image position and object property values to fit a function relating image position (for a given viewpoint) to object size and vertical orientation (in the real world, as opposed to the image space). The function performs image object property normalization which can be used to measure normalized property values and improve object classification.

During a classification phase 180, the normalization parameters and normalized training data set are used by a normalized classification process 400, discussed further below in conjunction with FIG. 4, to classify moving objects with improved accuracy. The normalization parameters allow the second classification phase to perform improved classification based on normalized features.

Thus, a base object classifier is first used to coarsely identify objects in one or more images and then this information is used to learn normalization parameters. Once the normalization parameters are known, a more sophisticated classifier can optionally more accurately recognize object types, such as a person or vehicle.

Classification and Normalization Background

Classification

A number of systems have been developed to classify objects for digital video surveillance. These systems typically either perform object detection without prior segmentation or object classification after moving object detection. Systems of the former type are most often used when full surveillance systems are not used and a specific object type such as a pedestrian or face needs to be detected. Systems of the latter type are part of larger systems which first perform object detection and tracking. The present invention is an example of the latter type.

After moving objects are detected, features are extracted for each frame, for each object, based on image measurements combined with a history of previous feature measurements. Standard statistical classifiers for supervised learning, such as nearest neighbor, neural networks or support vector machines, are then used to classify objects based on training data. For robust and portable object classification, extensive training data is required to cover the wide range of camera/object viewpoints and different scenarios.

An important step in all object classification methods is to extract suitable features from the image data. Features may be based on raw appearance, color, texture, shape or motion. At the lowest level, classification methods filter image data but still maintain per pixel values. Mohan et al., "Example-Based Object Detection in Images by Components," IEEE Trans. on Pattern Analysis and Machine Intelligence, vol. 23, no. 4, 349-361 (April 2001), describes a set of Haar wavelets to detect people in frontal imagery. In order to speed up their detection process, a subset of wavelets are used which encode the outline of the body.

The symmetry inherent in human beings was exploited as a useful low-level feature for people detection in images (i.e., without prior segmentation) as described in Utsumi et al., "Human Detection Using Geometrical Pixel Value Sructures," Proc. of Fifth Int'l Conf. on Automatic Face and Gesture Recognition, 39-44 (May, 2002). In their work, a distance map is computed based on the statistics of interblock distances of image intensities. Since people typically exhibit systematic symmetries, they can be coarsely detected in this manner.

A number of proposed techniques have used features based on color and texture. Uchida et al., "Probabilistic Method of Real-Time Person Detection Using Color Image Sequences," Int'l Conf. on Intelligent Robots and Systems, 1983-1988 (October, 2001), describes a system that detects people based on a Bayesian pixel classification using skin color, shadow and background models. Skin color detection requires fairly high-resolution imagery. Typically, the most important role for color is in tracking rather than object classification.

Several techniques use shape information to classify objects. Segmented objects are often fitted to an ellipse and the major and minor axes, their ratio and their angle with respect to the image axes are computed. These simple measurements have been used effectively by several systems to distinguish vehicles from people. Another commonly used feature is compactness or dispersedness. Compactness refers to the ratio of the area to the square of the perimeter. This is a useful feature to discriminate vehicles from pedestrians since people typically have complex extremities. The difficulty is removing "extremity" artifacts due to noise. Rivlin et al., "A Real-Time System for Classification of Moving Objects," Proc. 16th Int'l Conf. on Pattern Recognition, Vol. 3, 688-91 (Aug. 11, 2002), found that a more useful feature was to use measurements based on the 'star skeleton.' This is based on determining the local maxima in the contour computed from the distance between contour and the center of mass.

Another important feature is based on object motion. A salient feature to detect people is the periodic motion exhibited as they walk or run. Javed et al., "Tracking and Object Classification for Automated Surveillance," Proc. $7^{th}$ European Conf. on Computer Vision, Vol. Part IV, 343-357 (May 28-31, 2002), defined a simple measurement based on recurrent motion based on gray level pixel changes. For these types of measurements to be effective, tracked objects must be accurately translated and scaled to align them to each other over time. Zhou et al., "Tracking and Classifying Moving Objects from Video," Proc. 2nd IEEE Int'l Workshop on Performance Evaluation of Tracking in Surveillance (Dec. 9, 2001), use the variation of motion direction since the direction of motion of vehicles changes slowly and smoothly. Rivlin et al., use the temporal characteristics of feature points based on the largest two DC components of the Fourier Transform of the feature time series. In this way, they are also able to distinguish whether a person is walking or running. Zhao et al., "Segmentation and Tracking of Multiple Humans in Complex Situations," IEEE Conf. on Computer Vision and Pattern Recognition, Vol. II, 194-201 (Jun. 13-15, 2000), use motion templates based on three dimensional motion capture data combined with calibration information, which can be used to determine the viewpoint direction, to perform walking motion recognition and verify whether a moving object is a walking person.

Several systems have been developed which are not view independent. Collins et al., "A System for Video Surveillance and Monitoring," CMU-RI-TR-00-12, VSAM Final Report, Carnegie Mellon University (2000), developed a vehicle/human classification system that is frame-based and uses compactness, area, bounding box aspect ratio, and camera zoom. This system is trained on data from the same view and uses the view dependent features, namely the area of the object. The system uses a neural network classification.

More recently, a number of techniques have been suggested to address the issue of view independence. Stauffer et al., "Robust Automated Planar Normalization of Tracking Data," Proc. Joint IEEE Int'l Workshop on VS-PETS, 1-8 (Oct. 11, 2003), describe a method to normalize properties of tracked objects. This method will be described in more detail in the following section entitled "Normalization." Bose et al., "Learning to Use Scene Context for Object Classification in Surveillance," Proc. Joint IEEE Int'l Workshop on VS-PETS, 94-101 (Oct. 11, 2003), describe a two phase system which is used to bootstrap the learning of scene context information for a new viewpoint. Scene context information includes location, direction of motion, aspect ratio, and orientation, for this viewpoint. The disclosed two phase system established that re-training based on more relevant information is useful.

The present invention recognizes that it is useful to apply normalization, directly improving feature measurements, and scene context information, learning the view-dependent statistics of object tracks in this view.

A number of object classification systems exist to distinguish vehicles, individuals and groups of people. For example, one system is based on shape features (compactness and ellipse parameters), recurrent motion measurements, speed and direction of motion. From a small set of training examples obtained from a different camera configuration, objects can be classified using a Fisher linear discriminant followed by temporal consistency.

Normalization

Normalization of image data is an important process in order to infer physical properties of objects in the scene with respect to absolute terms, such as meters or miles per hour. In order to classify objects accurately as seen from different cameras and different viewpoints, measured properties of objects should be invariant to camera viewpoint and location in the image. Normalization is necessary to estimate scale and determine the angle in which the camera is viewing the object. Measurements from image data must take into account the perspective distortion due to the projection of the world onto the image plane and other distortions such as lens distortion. In particular, for typical surveillance video with a far field view (i.e., the camera has its viewing direction nearly parallel to the ground plane), the farther an object lies, the smaller its projected image size will be. On the other hand, for an overhead camera looking down at a scene, a person standing more directly underneath the camera will appear shorter. The present invention recognizes that size and orientation value pairs can be predicted for a given position based on prior data and can be used to normalize live data at each position and across camera views.

Investigators in digital video surveillance have recently begun to address this issue. Traditionally this has been done by semi-automatic calibration (relying on an expert) or rich geometric primitives in the image (such as parallel or orthogonal lines in the image). But realistic digital surveillance, which can be generally deployed, requires an automated solution.

Lv et al., "Self-Calibration of a Camera from Video of a Walking Human," Proc. 16th Int'l Conf. on Pattern Recognition, Vol. I, 562-67 (August, 2002), pioneered an effort to perform self-calibration of a camera from the tracking data obtained of a walking human. With sufficiently high quality data, this method can be used to perform a full intrinsic and extrinsic calibration but in practice is somewhat unstable with realistic tracking data. More recently, Bose et al., "Ground Plane Rectification by Tracking Moving Objects," VS-PETS 2003, proposed a method to perform ground plane rectification based on tracked objects moving at a constant velocity. This method assumes the ground is planar and it is possible to acquire tracks of objects moving at a constant velocity. In practice, these assumptions cannot always be satisfied.

Stauffer et al., "Robust Automated Planar Normalization of Tracking Data," Proc. Joint IEEE Int'l Workshop on VS-PETS, 1-8 (Oct. 11, 2003), present a method in which projected properties $P_j$ of a particular track j, are modeled by a simple planar system such that the value of the property varies linearly with the distance from the horizon line. For each track j, an individual scale factor parameter $s_j$ and three global parameters of the planar model (a,b,c) are found as the best fit to the observations $(x_j, y_j, P_j)$ for all j. This method is applied to all tracks regardless of the object type (such as vehicle, pedestrian, and animal). The limitation of this approach is that object properties, such as height and width, depend heavily on the viewpoint direction, particularly for vehicles whose length and width vary greatly. Although in theory, the change in the projected property should vary nearly linearly with distance; this also assumes a planar ground surface, no occlusion, and only perspective distortion.

The normalization method of the present invention does not rely on a planar ground surface, is not limited to certain camera viewpoint directions (far field), is not linear/planar, nor does it require objects moving at a constant velocity. The disclosed system relies either on pedestrian data obtained from a classifier or input into the system. In the former case, the classifier is run over an extended period, to obtain several sequences in which pedestrians traverse the space. The classifier determines if the track is a person, or a vehicle. In each case, a confidence measure is assigned to the classification result. Sequences classified as humans, whose confidence measures are relatively high are selected as input data to the normalization system. This typically finds sequences of pedestrian data without shadows, from decent imaging conditions (no precipitation or wind) and simple pedestrian shape and motions (not carrying objects, wearing hats, holding umbrellas, or performing odd behaviors.)

Two Phase Normalization

FIG. 2 illustrates the training phase 150 of the object normalization and classification system of FIG. 1 in further detail. FIG. 2 illustrates the training phase 150 for one exemplary camera N, but the same training process is performed to generate normalization parameters for each camera and viewpoint. As shown in FIG. 2, the object normalization and classification system 100 processes an image sequence 210 received from each of a plurality, N, of cameras (not shown).

Initially, the features of interest are extrated from the images during step 220. As discussed below, an exemplary 7-dimensional feature space is extracted from the image sequences for processing by a base classifier 230. In addition, an exemplary 5-dimensional feature space is employed for the normalized features 240, discussed below.

The base classifier 230 applies a supervised object classification system to the image data 210. For example, in one exemplary implementation, the base classifier may employ an object classification system that detects moving objects by combining evidence from differences in color, texture and motion. This background subtraction approach, by exploiting multiple modalities, is useful for detecting objects in cluttered environments. For a detailed discussion of a suitable background subtraction approach, see, for example, J. Connel et al., "Detection and Tracking in the IBM People Vision System," ICME 2003. The resulting saliency map can be smoothed and holes removed using morphological operators. In addition, several mechanisms are optionally built-in to handle changing ambient conditions and scene composition. Detected objects are then tracked using both appearance models and movement characteristics for each detected object. See, A. Senior et al., "Appearance Models for Occlusion Handling," in Proc. 2nd IEEE Int'l Workshop on Performance Evaluation of Tracking in Surveillance (Dec. 9, 2001). Only objects whose tracks are stable, i.e., they are not undergoing merge/split, occlusion, or do not lie on the image border, are used for training or testing the object classification system.

In an alternate implementation, the base classifier 230 may be embodied using any known techniques, such as background subtraction, tracking, detection or a combination thereof, to segment and measure objects of interest in a plurality of images and to classify the objects of interest based on feature vectors.

The base classifier generates classification results that comprise, for each object, e.g., the assigned class, confidence, position, height and direction. It is noted that the classification results can also be manually generated. In one implementation, an adaptive threshold is applied to the classification results, such that only objects with a confidence level that exceeds the current adaptive threshold are considered for further processing.

As shown in FIG. 2, the classification results from the base classifier are applied to a normalization stage 300, as discussed further below in conjunction with FIG. 3. Generally, the normalization process 300 determines normalization parameters for each viewpoint that allow the second phase to perform improved classification based on normalized features.

Object classification systems based on the background subtraction approach can employ a number of features based on shape, motion, and periodicity. For example, some or all of the following features can be employed by the base classifier during step 230:

1 compactness or dispersedness (perimeter^2/area);
2 variation in compactness (for a time window, such as 20 frames);
3 fitted ellipse major/minor axis ratio;
4 fitted ellipse near horizontal/near vertical axis ratio;
5 major axis angle;
6 magnitude of velocity;
7 direction of motion;
8 variation in direction of motion (for a time window, such as 20 frames);
9 direction of motion with respect to major axis direction (angle difference)—circular statistic;
10 simplified concavity metric: percent object filling bounding box;
11 average from recurrent motion image—bottom third;
12 average from recurrent motion image—middle third; and
13 average from recurrent motion image—bottom two thirds Circular statistics have been proposed for directional features 5, 7 and 9. See, N. Cox, "Analysing Circular Data in Stata," NASUG, (March 2001). Generally, circular statistics provide a simple representation of an angle (or periodic measurement) which enables accurate measurement of the circular distance between two measurements. This addresses the problem that the beginning and end of the scale are the same (i.e., 0 degrees equals 360 degrees).

Average recurrent motion image measurements for features 11 through 13 can be based on techniques described in O. Javed and M. Shah, "Tracking and Object Classification for Automated Surveillance," in Proc. 7$^{th}$ European Conference on Computer Vision, Vol. Part IV, 343-357 (May, 2002).

An exemplary implementation of the base classifier 230 employs features 1, 2, 3, 4, 6, 7 and 13 and nearest neighbor classification with 10 neighbors. The inverse to the closest distance can be used as a confidence for the result.

As shown in FIG. 2 normalized features are computed for the current camera viewpoint during step 240. In an exemplary implementation, the normalized features are:

1. Normalized major axis;
2. Normalized minor axis;
3. Normalized area;
3. Normalized velocity;
4. Normalized direction of motion; and
5. Normalized angle of ellipse.

The normalized features for the current camera N from step 240, as well as normalized features for the other cameras from step 250 are processed during step 260 to compute the normalized training data. Generally, the normalized features for the current camera are compared to the classification training data from a number of viewpoints.

The final phase II system used all the phase I features plus features 1, 2, & 3. Normalization based on size only (not orientation) was used. Classification was performed using nearest neighbor classification with 10 neighbors. Track identification was based on majority vote.

FIG. 3 is a flow chart describing an exemplary implementation of the normalization process 300 of FIG. 2 in further detail. As previously indicated, the normalization process 300 determines normalization parameters that allow the second phase to perform improved classification based on normalized features. The normalization process 300 does not rely on a planar ground surface, is not limited to certain camera viewpoint directions (far field), is not a linear/planar model, nor does it require objects moving at a constant velocity. The normalization process 300 processes either pedestrian data obtained from the base classifier 230 or input into the system 100. In the former case, the base classifier 230 is run over an extended period, to obtain several sequences in which pedestrians traverse the space.

The base classifier 230 determines if the track is a person based on the average confidence of the track. As indicated above, the confidence level can be based on the inverse of the normalized closest distance to the nearest neighbor in the exemplary 7-dimensional feature space. Sequences classified as humans, whose confidence measures are relatively high (for example, scores in the highest 50 percent) are selected as input data to the normalization process 300. This typically finds sequences of pedestrian data without shadows, from decent imaging conditions (no precipitation or wind) and simple pedestrian shape and motions (not carrying objects, wearing hats, holding umbrellas, or performing odd behaviors.)

As shown in FIG. 3, the normalization process 300 initially obtains track data for several pedestrians moving around different locations in a scene during step 310. Generally, the track data provides the height and orientation of a person at various locations of an image. For example, for each image frame, j, the track data may identify the position $(x_j, y_j)$ of the bottom of the pedestrian (based on the location of the bottom of the major axis of an ellipse which is fit to the data), as well as the length (H) and orientation ($\theta$) of the major axis of the object.

Normalization is performed during step 320 by a least squares fitting of a second order polynomial to this data. For each parameter, $p \in (H, \theta)$, the sum of squares is minimized as follows:

$$\min_{a_1 \ldots a_6} \text{over} \sum_j [p_j - (p(x_j, y_j; a_1 \ldots a_6)]^2$$

where $a_1 \ldots a_6$ are the coefficients of the polynomial. For each position in the image, the height and orientation of the projected image of a person can be predicted. The normalization process 300 uses image position and object property values to fit the function that relates image position (for a given viewpoint) to object size (H) and vertical orientation ($\theta$). The function performs image object property normalization which can be used to measure normalized property values and improve object classification.

For example, for a given viewpoint, the normalization process 300 can predict the height, H, of a pedestrian at different locations in an image. Thereafter, given the height and location in an image, as well as the normalization parameters, the height can be computed at any desired location based on a scale factor for that location In general, the normalization process 300 can project any property of an object at a given location in the image. Normalized metrics include area, length, major/minor axis length, major axis angle, and velocity magnitude. For subsystems that rely on frame to frame alignment of the detected object, such as appearance-based tracking or recurrent motion estimation for the classifier, normalized metrics alleviate the need to scale to an initial segmentation and to estimate a re-scaling on a frame-to-frame basis. The present invention can distinguish if a projected view is getting larger for other reasons, such as a change in the three dimensional position.

Thus, the normalization parameters are based on training data from several different camera viewpoints.

The normalization enables absolute identification of size and speed which can be used in various ways including identifying vehicles of a certain size and searching for objects of specific sizes or traveling at specific speeds across different locations in the image and across different viewpoints and cameras.

Figure 4:
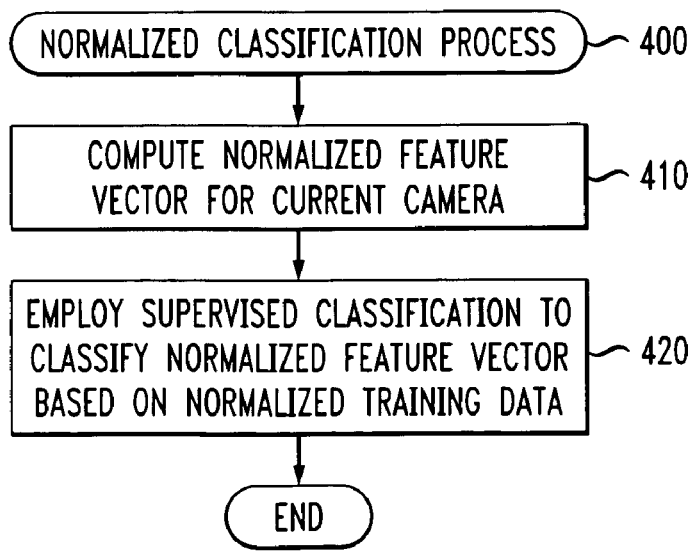
FIG. 4 is a flow chart describing an exemplary implementation of the normalized classification process of FIG. 1 in further detail.

FIG. 4 is a flow chart describing an exemplary implementation of the normalized classification process 400 of FIG. 1 in further detail. The normalized classification process 400 uses the normalization parameters and normalized features computed during the training phase to more accurately classify objects of interest. The normalized classification process 400 processes normalized features to improve the classification for the current view.

As shown in FIG. 4, the normalized classification process 400 initially computes the normalized feature vector for the current camera during step 410. Thereafter, the normalized classification process 400 employs supervised classification to classify the normalized feature vector based on the normalized training data during step 420.

Figure 5:
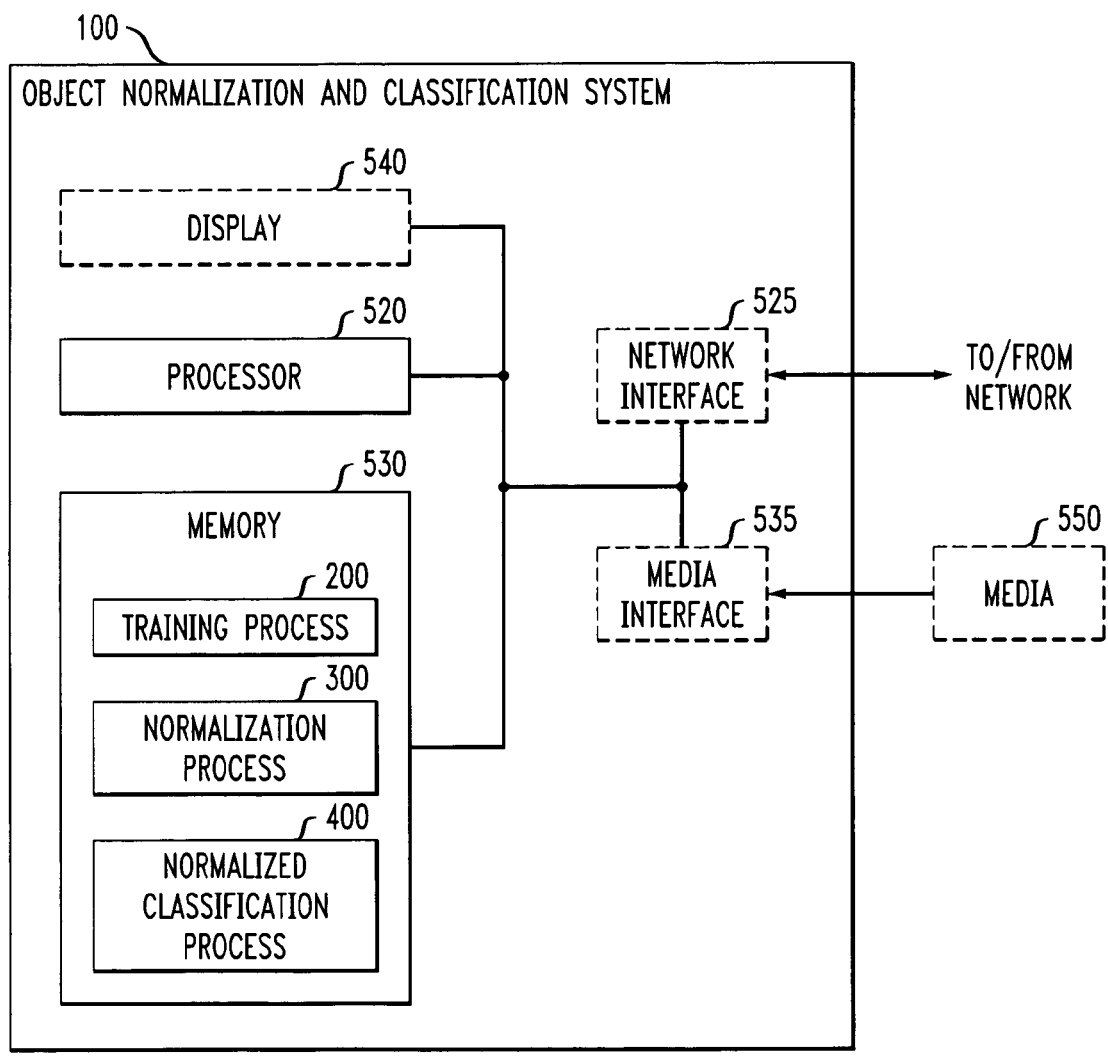
FIG. 5 is a schematic block diagram of an exemplary implementation of the object normalization and classification system of FIG. 1.

FIG. 5 is a diagram illustrating an exemplary object normalization and classification system 100. As shown in FIG. 5, the object normalization and classification system 100 is a computer system that optionally interacts with media 550. The object normalization and classification system 100 comprises a processor 520 and memory 530, and, optionally, a network interface 525, media interface 535 and display 540. Network interface 525 allows the object normalization and classification system 100 to connect to a network, while media interface 535 allows the object normalization and classification system 100 to interact with media 550, such as a Digital Versatile Disk (DVD) or a hard drive. Optional video display 540 is any type of video display suitable for interacting with a human user of the object normalization and classification system 100. Generally, video display 540 is a computer monitor or other similar video display.

System and Article of Manufacture Details

At is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for normalizing objects across a plurality of image viewpoints, comprising:

obtaining a set of classification results for a given object class across a plurality of sequential images for each of said plurality of viewpoints, each of said classification results comprised of a position of one of said objects in said sequential image, and at least one projected property of said object at said position; and determining normalization parameters for each of said plurality of viewpoints by fitting a high order model to said classification results to model a change in said at least one projected property.

2. The method of claim 1, wherein said at least one projected property of said object includes one or more of a linear size and orientation of said object.

3. The method of claim 1, wherein said set of classification results across a plurality of sequential images are based on object tracks.

4. The method of claim 1, wherein said determining step performs a least squares fit of a second order polynomial to said classification results.

5. The method of claim 4, wherein said determining step further comprises the step of minimizing, for a given parameter, p, the following:

$$\min_{a_1 \ldots a_6} \text{over} \sum_j [p_j - (p(x_j, y_j; a_1 \ldots a_6)]^2$$

where $(x_j, y_j)$ identify a position in an image and $\alpha_1$-$\alpha_6$ are the coefficients of the polynomial.

6. The method of claim 1, wherein said determining step uses image position and object property values to fit a function that relates image position for a given viewpoint to at least one projected property.

7. The method of claim 1, wherein said normalization parameters can be used to measure normalized property values.

8. The method of claim 1, wherein said classification results are obtained from a base classifier.

9. The method of claim 8, wherein said base classifier implements a background subtraction approach.

10. The method of claim 1, further comprising the step of applying an adaptive threshold to said classification results.

11. The method of claim 1, wherein said classification results are associated with objects from object tracks having a sufficient confidence score.

12. The method of claim 1, further comprising the step of using said normalization parameters to compute normalized features and normalized training data for object classification.

13. A method for classifying an object, comprising:
obtaining a set of classification results for a given object class across a plurality of sequential images for a plurality of viewpoints, each of said classification results comprised of a position of one of said objects in said sequential image, and at least one projected property of said object at said position;
determining normalization parameters for each of said plurality of viewpoints by fitting a high order model to said classification results;
computing normalized training data during a training mode; and
classifying said object using a set of normalized features and said normalized training data.

14. The method of claim 13, wherein said set of classification results across a plurality of sequential images are based on object tracks.

15. The method of claim 13, wherein said determining step uses image position and object property values to fit a function that relates image position for a given viewpoint to at least one projected property.

16. An apparatus for normalizing objects across a plurality of image viewpoints, the apparatus comprising:
a memory; and
at least one processor, coupled to the memory, operative to:
obtain a set of classification results for a given object class across a plurality of sequential images for each of said plurality of viewpoints, each of said classification results comprised of a position of one of said objects in said sequential image, and at least one projected property of said object at said position; and
determine normalization parameters for each of said plurality of viewpoints by fitting a high order model to said classification results to model a change in said at least one projected property.

17. The apparatus of claim 16, wherein said set of classification results across a plurality of sequential images are based on object tracks.

18. The apparatus of claim 16, wherein said processor is further configured to determine said normalization parameters using image position and object property values to fit a function that relates image position for a given viewpoint to at least one projected property.

19. An article of manufacture for normalizing objects across a plurality of image viewpoints, comprising a computer readable medium encoded with one or more computer programs for performing the steps of:
obtaining a set of classification results for a given object class across a plurality of sequential images for each of said plurality of viewpoints, each of said said classification results comprised of a position of one of said objects in said sequential image, and at least one projected property of said object at said position; and
determining normalization parameters for each of said plurality of viewpoints by filling a high order model to said classification results to model a change in said at least one projected property.

20. The article of manufacture of claim 19, wherein said one or more programs implement the step of determining said normalization parameters using image position and object property values to fit a function that relates image position for a given viewpoint to at least one projected property.

* * * * *